H. K. POTTER.
NOZZLE FOR OIL DISTRIBUTERS.
APPLICATION FILED JUNE 7, 1912.

1,084,359. Patented Jan. 13, 1914.

Witnesses

Inventor
Henry K. Potter
By J. Dushane
His Attorney

UNITED STATES PATENT OFFICE.

HENRY K. POTTER, OF SOMERVILLE, MASSACHUSETTS.

NOZZLE FOR OIL-DISTRIBUTERS.

1,084,359.

Specification of Letters Patent. Patented Jan. 13, 1914.

Application filed June 7, 1912. Serial No. 702,144.

*To all whom it may concern:*

Be it known that I, HENRY K. POTTER, a citizen of the United States, residing at Somerville, in the county of Middlesex and State of Massachusetts, have invented certain new and useful Improvements in Nozzles for Oil-Distributers, of which the following is a specification.

This invention relates to improvements in nozzles in oil distributers, and has for its particular objects to provide a simple and inexpensive device that can be easily placed in position within the distributing pipe of a tank wagon or cart, and to spray the oil over the roadway.

With the above and other objects in view, the present invention consists in the combination and arrangements of the parts as will be more fully described hereinafter, shown in the accompanying drawings, and particularly pointed out in the appended claim, it being understood, that changes in form, proportion, size and minor details, may be made within the scope of the claim without departing from the spirit or sacrificing any of the advantages of the invention.

Figure 1:
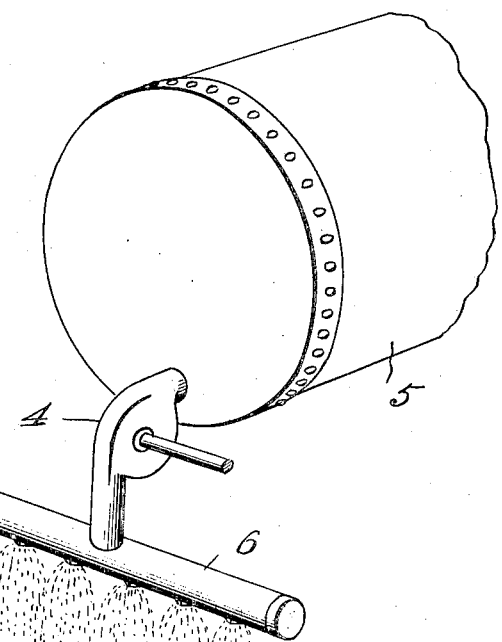
Figure 2:
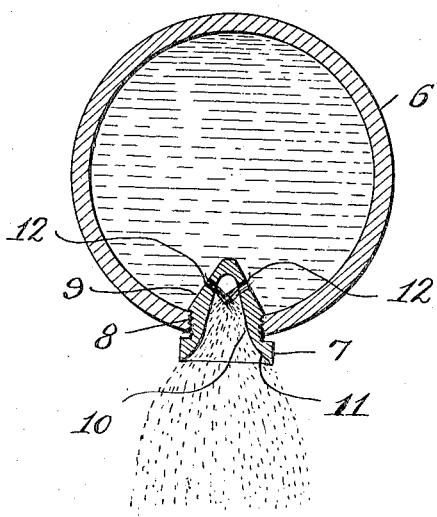
Figure 3:
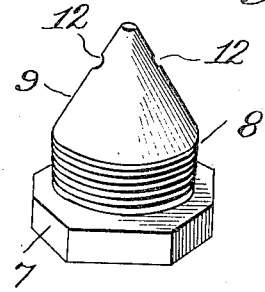

In the drawing Figure 1 is a perspective view of a portion of a tank with a distributing pipe secured thereto and showing the oil being sprayed therefrom. Fig. 2 is a cross section through the distributing pipe showing one of the improved nozzles secured therein, and Fig. 3 is a perspective view of one of the nozzles.

Similar reference numerals in all of the figures of the drawing designate like parts.

In oil sprinkling or distributing carts, it is preferable to force the oil out of the distributing nozzles either by compression within the tank or utilizing a pump for the purpose, and in the drawings is illustrated a pump 4, connected intermediate the tank 5 and the usual distributing pipe 6 which extends transversely of the roadway, it being understood that the pump can be driven in any well known manner, and as this is no part of the invention it has not been shown in the drawings.

The distributing pipe 6 is usually provided with a plurality of nozzles located or positioned in its underside, and this improvement relates to said nozzles and they are preferably constructed as follows: From a base 7 preferably angular in contour, extends a body portion 8, of less diameter than the base 7 and exteriorly screw threaded, and provided with a conical top 9 whose base is of the same diameter as said body-portion and which is adapted to project into the distributing pipe 6, as shown clearly in Fig. 2 of the drawings. The nozzle is provided with a cavity 10, preferably bell-shaped and provided with a flaring mouth 11. Said cavity extends to near the apex of the conical top 9 and the walls around it are formed sloping which merge gradually into the flaring mouth 11. To permit oil to enter the cavity 10 from the distributing pipe 6, apertures 12, preferably two in number and diametrically opposite each other, are formed through the wall of the conical top 9, adjacent to its apex and above said threaded body-portion. It will be noted that the axes of the apertures 12 are directed downward to a common center and toward the inclined walls of cavity 10, thus when the streams of oil contact and are broken into spray, the spray is directed downward in contact with the side-walls of the cavity owing to the force of the streams of oil being directed toward said side-walls.

With the construction of nozzle above described, and the distributing pipe provided with threaded openings for the reception of the same, said nozzles are inserted and screwed into position with a wrench adapted to engage the angular contour of the base. The conical top, as before mentioned, projects into the distributing pipe 6, allows a free flow of oil in said pipe and prevents the lodgment of sediment around the cap which would clog the openings and by positioning said openings above said threaded body-portion places them above the bottom of the distributing pipe and prevents their clogging by the sediment passing around the base of the conical cap.

The apertures 12 are preferably inclined to direct the flow of oil downwardly, and of such inclination, as to cause the streams of oil projected therefrom to contact within the top end of the cavity 10, with the effect of comminuting the oil and cause it to emerge from the flaring mouth in a fine spray somewhat fan-shaped as illustrated.

It will be observed, that the walls of the cavity 10 are smooth and unobstructed, and when the spray is formed by the impacting streams of oil from the apertures 12, it readily discharges from the cavity and the flaring mouth which is a continuation of the side walls allows it to spread somewhat horizontal and not be forced directly toward the ground.

In reducing the streams of oil to spray, the effect upon the roadway is very beneficial, in that it mixes with the dust more effectually than when it is distributed in fine streams as is usual.

Having thus fully described the invention, what is claimed is:

A nozzle, comprising a polygonal base, a threaded body-portion and a conical top whose base is of the same diameter as said body-portion, said polygonal base, body and conical top having formed therein a cavity consisting of a tapered portion and a curved flaring mouth, the walls of said tapered portion being straight and gradually merging into the curved mouth, whereby smooth and unobstructed cavity walls are provided, the walls of said conical top being provided with apertures above said threaded body-portion, said apertures having their axes directed downward to a common center and toward the inclined walls of said tapered portion.

In testimony whereof I affix my signature in presence of two witnesses.

HENRY K. POTTER.

Witnesses:
ALICE H. MORRISON,
HELEN M. PURCELL.